(12) United States Patent
Wan et al.

(10) Patent No.: US 8,437,112 B2
(45) Date of Patent: *May 7, 2013

(54) CIRCUIT BREAKER WITH TIME-DELAY FUNCTION

(75) Inventors: Jiasheng Wan, Wuhan (CN); Zhiqiang Wang, Wuhan (CN)

(73) Assignee: Hubei Shengjia Electric Apparatus Co., Ltd., Wuhan (CN)

( * ) Notice: Subject to any disclaimer, the term of this patent is extended or adjusted under 35 U.S.C. 154(b) by 447 days.

This patent is subject to a terminal disclaimer.

(21) Appl. No.: 12/774,968

(22) Filed: May 6, 2010

(65) Prior Publication Data

US 2011/0273818 A1   Nov. 10, 2011

(51) Int. Cl.
*H02H 3/00* (2006.01)
(52) U.S. Cl.
USPC .......................................................... 361/94
(58) Field of Classification Search ....................... 361/94
See application file for complete search history.

(56) References Cited

U.S. PATENT DOCUMENTS 3,883,781 A * 5/1975 Cotton ............................ 361/37

* cited by examiner

*Primary Examiner* — Stephen W Jackson
(74) *Attorney, Agent, or Firm* — Matthias Scholl P.C.; Matthias Scholl (57) ABSTRACT

A circuit breaker with a time-delay function, including a first circuit breaking unit, a remote control unit comprising a time-delay control circuit, and a housing. The first circuit breaking unit and the remote control unit are disposed in the housing, the first circuit breaking unit operates to switch on or off loads and electric lines, the remote control unit operates to control interruption of the circuit breaker with a time-delay function via a remote control signal, the time-delay control circuit operates to implement time delay after the remote control unit receives the remote control signal and before the first circuit breaking unit switches on or off the loads and the electric lines, and the housing is made of insulating and flame-retardant materials.

20 Claims, 6 Drawing Sheets

CIRCUIT BREAKER WITH TIME-DELAY FUNCTION

BACKGROUND OF THE INVENTION

1. Field of the Invention

The invention relates to a circuit breaker, and more particularly to a circuit breaker with a time-delay function.

2. Description of the Related Art

Figure 1:
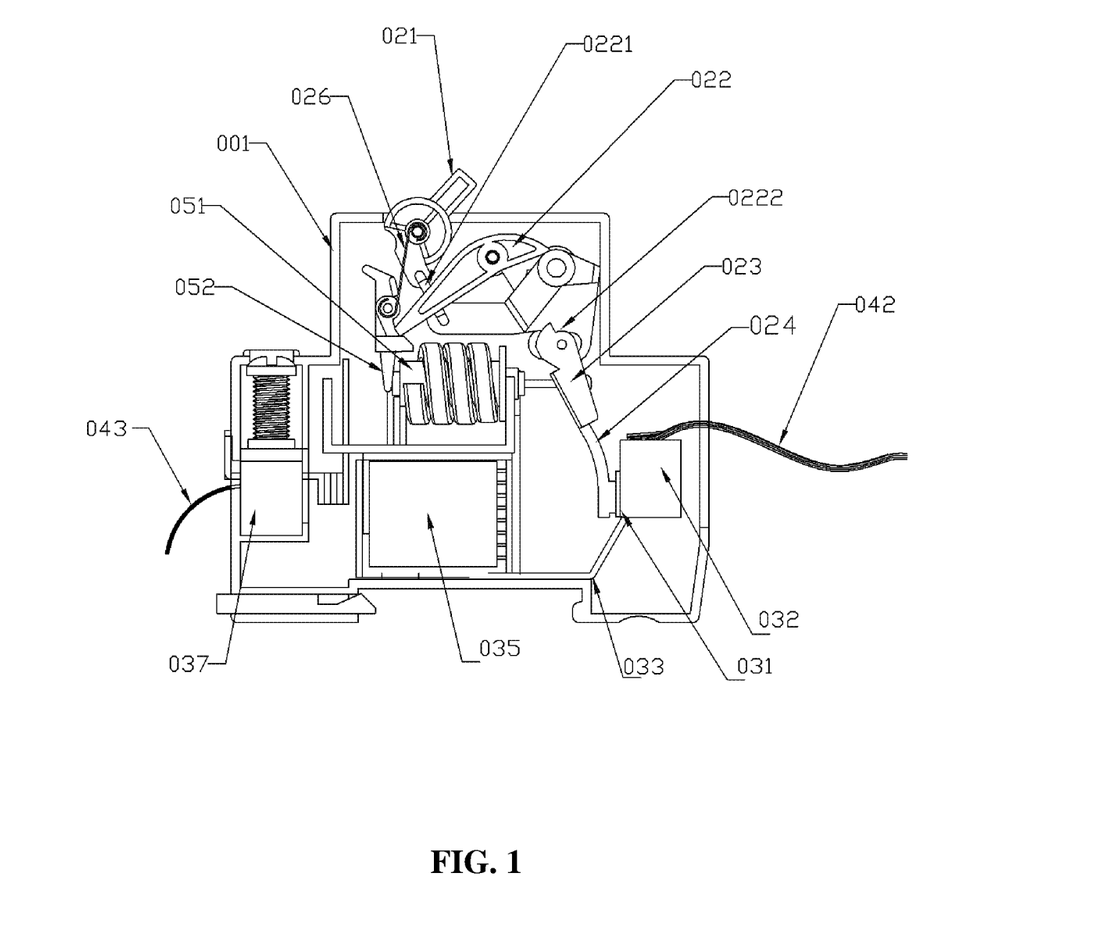
FIG. 1 is a schematic view of a circuit breaker in the prior art.

Nowadays circuit breakers are widely used for protecting and controlling electrical power transmission networks. As shown in FIG. 1, a circuit breaker in the prior art comprises a firewire input end 032 and a firewire output end 037 connected to electric lines, an operating portion, comprising a lever 021 having an operating end disposed outside a housing 001 and operating to switch on or off a circuit, a first movable contact 024 having a first movable contact point 025 disposed on one end thereof, a linkage control block comprising multiple linkage parts 022 comprising multiple linkage parts and rotating with respect to a shaft in the housing 001, one end of an uppermost linkage part 0221 being connected to the lever 021, and one end of a downmost linkage part 0222 being connected to a front end 023 of the first movable contact, a static contact point 031 connected to the firewire input end 032. As the lever 021 rotates, the linkage control block 022 forces the first movable contact 024 to move, whereby implementing attachment and detachment between the first movable contact point 025 and the static contact point 031 and thus switch-on and switch-off of the electric lines. The circuit breaker further comprises an arc extinguishing portion and an over-current protecting portion 051. The arc extinguishing portion operates to prevent electric arc from damaging the circuit breaker, and comprises a metal plate 033 and an arc-extinguishing cover 035. The metal plate 033 is connected to the static contact point 031 and extends to the bottom of the housing 001. The arc-extinguishing cover 035 corresponds to the static contact point 031. The over-current protecting portion 051 is an electromagnetic release disposed below the operating portion. One end of the over-current protecting portion 051 is connected to the removable contact, and the other end thereof is connected to one end of the linkage part 052, and the other end of the linkage part 052 is connected to the linkage control block 022. As over current occurs on the electric lines, the first movable contact point is separated from the static contact point whereby disconnecting the loads from the electric lines.

However, there are several un-neglectable problems with the existing circuit breaker: firstly, the circuit breaker cannot be remotely controlled, if a load is to be disconnected from electric lines due to some reasons (such as owing money) via the circuit breaker, operators need to get to the site and solve the problem, which reduces operation efficiency; secondly, after long-term use, adhesion between the first movable contact point and the static contact point occurs, which reduces safety of the circuit breaker; thirdly, as power failure occurs, users cannot determine whether the circuit breaker fails and often blindly repair the circuit breaker, which reduces safety thereof; finally, if the circuit breaker fails, no clear indication is given to users, which makes it impossible to timely repair the circuit breaker and to normally use electricity.

SUMMARY OF THE INVENTION

In view of the above-described problem, it is one objective of the invention to provide a circuit breaker with a time-delay function that is capable of addressing the above-mentioned problems.

To achieve the above objectives, in accordance with one embodiment of the invention, provided is a circuit breaker with a time-delay function, comprising a first circuit breaking unit, a remote control unit comprising a time-delay control circuit, and a housing. The first circuit breaking unit and the remote control unit are disposed in the housing, the first circuit breaking unit operates to switch on or off loads and electric lines, the remote control unit operates to control interruption of the circuit breaker with a time-delay function via a remote control signal, the time-delay control circuit operates to implement time delay after the remote control unit receives the remote control signal and before the first circuit breaking unit switches on or off the loads and the electric lines, and the housing is made of insulating and flame-retardant materials.

In a class of this embodiment, the first circuit breaking unit comprises a first operating portion, an arc extinguishing portion, an over-current protecting portion, and a first terminal, the first operating portion operates to switch on or off the loads and the electric lines, the arc extinguishing portion operates to prevent arc from corrupting the circuit breaker, the over-current protecting portion operates to prevent over-current from burning the circuit breaker, and the first terminal is connected to a phase line.

In a class of this embodiment, the first operating portion comprises a lever, a first movable contact, a linkage control block comprising multiple linkage parts, and a static contact point, one end of the lever is disposed outside the housing and operates to switch on or off the electric lines, a first movable contact point is disposed on one end of the first movable contact, the linkage parts are hinge-connected to each other, one end of an uppermost linkage part is connected to the lever, one end of a downmost linkage part is connected to a front end of the first movable contact, the static contact point is connected to the first terminal, and fluorescent coating is disposed on the static contact point and the first movable contact point.

In a class of this embodiment, the over-current protecting portion is disposed below the first operating portion, one end of the over-current protecting portion is connected to the first movable contact, the other end thereof is connected to a support linage part of the linkage control block, the over-current protecting portion is an electromagnetic release, and the over-current protecting portion separates the first movable contact point from the static contact point whereby disconnecting the loads from the electric lines as over current of the electric lines occurs.

In a class of this embodiment, the remote control unit comprises a disconnecting portion and a control circuit, the disconnecting portion operates to disconnect the loads form the electric lines, and the control circuit is connected to the disconnecting portion and operates to control the disconnecting portion.

In a class of this embodiment, the disconnecting portion comprises a first electromagnet having a magnet core, and a first armature, the first armature is disposed below the linkage part, and one end of the first electromagnet corresponds to the first armature. the disconnecting portion comprises a first electromagnet having a magnet core, and a first armature, the first armature is disposed below the linkage part, and one end of the first electromagnet corresponds to the first armature.

In a class of this embodiment, the control portion comprises a power supply circuit, and a power supply control circuit, the power supply circuit is connected to the electromagnet coil of the disconnecting portion whereby supplying power thereto, and the power supply control circuit operates to switch on or off the power supply circuit whereby controlling operation of the disconnecting portion.

In a class of this embodiment, the power supply circuit is a rectifying circuit, an output end of the power supply circuit is connected to an input end of an electromagnetic coil of the first electromagnet, and an input end of the power supply circuit and an output end of the electromagnetic coil of the electromagnet are respectively connected to a phase line terminal and a zero line terminal of an output terminal of the electric line.

In a class of this embodiment, the power supply control circuit comprises a first photoelectric coupler, and a thyristor, one output end of the first photoelectric coupler is connected to a cathode of the power supply circuit, the first photoelectric coupler operates to transmit a control signal, the other output end of the first photoelectric coupler is connected to a control end of the thyristor, and the other two ends of the thyristor are connected to a cathode and an anode of the power supply circuit, whereby switching on or off the control circuit.

In a class of this embodiment, the power supply control circuit comprises a photoelectric receiving tube, and a thyristor, the photoelectric receiving tube receives an optical signal from a remote control center via optical fiber and a plug, an output end of the photoelectric receiving tube is connected to the ground, a control end of the thyristor is connected to the other end of the photoelectric receiving tube, the other two ends of the thyristor are connected to a cathode and an anode of the power supply circuit, whereby switching on or off the control circuit.

In a class of this embodiment, the time-delay control circuit comprises a capacitor and a resistor, one end of the capacitor is connected to the other output end of the first photoelectric coupler, and the other end thereof is connected to the ground, and one end of the resistor is connected to the end of the capacitor, and the other end thereof is connected to the power supply circuit.

In a class of this embodiment, it further comprises a feedback circuit, comprising a second photoelectric coupler having an end connected to a cathode of the power supply circuit, and the other end connected to the ground.

In a class of this embodiment, an output end of the second photoelectric coupler outputs a switching signal to a remote control device as the electric line is connected.

In a class of this embodiment, it further comprises a feedback circuit, comprising a light emitting diode (LED) having an end connected to a cathode of the power supply circuit, and the other end connected to the ground.

In a class of this embodiment, an output end of the LED outputs an optical signal, and transmits the optical signal to a remote control device via the optical fiber and the plug as the electric line is connected.

In a class of this embodiment, a signal receiving circuit operating to receive a wireless control signal from outside, a decoding circuit connected to the signal receiving circuit and operating to decode the wireless control signal and to obtain a digital control signal, and a parsing circuit operating to parse the digital control signal, to transform the digital control signal into a voltage signal, and to transmit the voltage signal to the power supply control circuit.

In a class of this embodiment, it further comprises a second circuit breaking unit operating to disconnect the loads from the electric lines as the first circuit breaking unit fails.

In a class of this embodiment, the second circuit breaking unit comprises a detecting circuit operating to detect whether the first circuit breaking unit fails, and a second operating portion operating to disconnect the loads from the electric lines as the first circuit breaking unit fails.

In a class of this embodiment, the detecting circuit comprises a contact switch and a second electromagnet, the contact switch is disposed below the lever, one end of the contact switch is connected to an end of the first movable contact via a wire, the second electromagnet is disposed on a support in the housing, an input end of the second electromagnet is connected to the wire, an output end of the second electromagnet is connected to a zero line terminal, the contact switch is switched on as the level is switched to an open circuit position, and the second electromagnet operates as no phase line is disconnected.

In a class of this embodiment, the second operating portion comprises a rotatable frame, a rotatable plate, a second movable contact, and a connecting frame, the rotatable frame rotates with respect to a hinge shaft and has a lap surface, one end of the magnet core abuts against the rotatable frame, the rotatable plate rotates with respect to the hinge shaft, one end of the rotatable plate abuts against the lap surface of the rotatable frame, the second movable contact is disposed in the support, and comprises a T-shaped holder and a spring, the spring is fit on the T-shaped holder, a conductive contact point is disposed on one end of the T-shaped holder, the other end of the T-shaped holder abuts against the other end of the rotatable plate, and a second terminal is disposed in the connecting frame and connected to the phase line via a pair of stationary contact points.

Advantages of the invention comprises: firstly, remote control implements remote power-on and power-off, which reduces labor cost and electricity management cost; secondly, photoelectric isolation guarantees safety of operators; thirdly, the second circuit breaking unit disconnects the loads from the electric lines as adhesion between the first movable contact point and the static contact point occurs, which improves safety; fourthly, the second indicating lamp makes it possible to clearly determine whether power failure occurs or the circuit breaker fails, which prevents blind repairing; finally, the first indicating lamp timely indicates whether a switch-off function of the first circuit breaking unit fails, and thus safety of the circuit breaker is improved.

BRIEF DESCRIPTION OF THE DRAWINGS

The invention is described hereinafter with reference to accompanying drawings, in which.

DETAILED DESCRIPTION OF THE EMBODIMENTS

Figure 2:
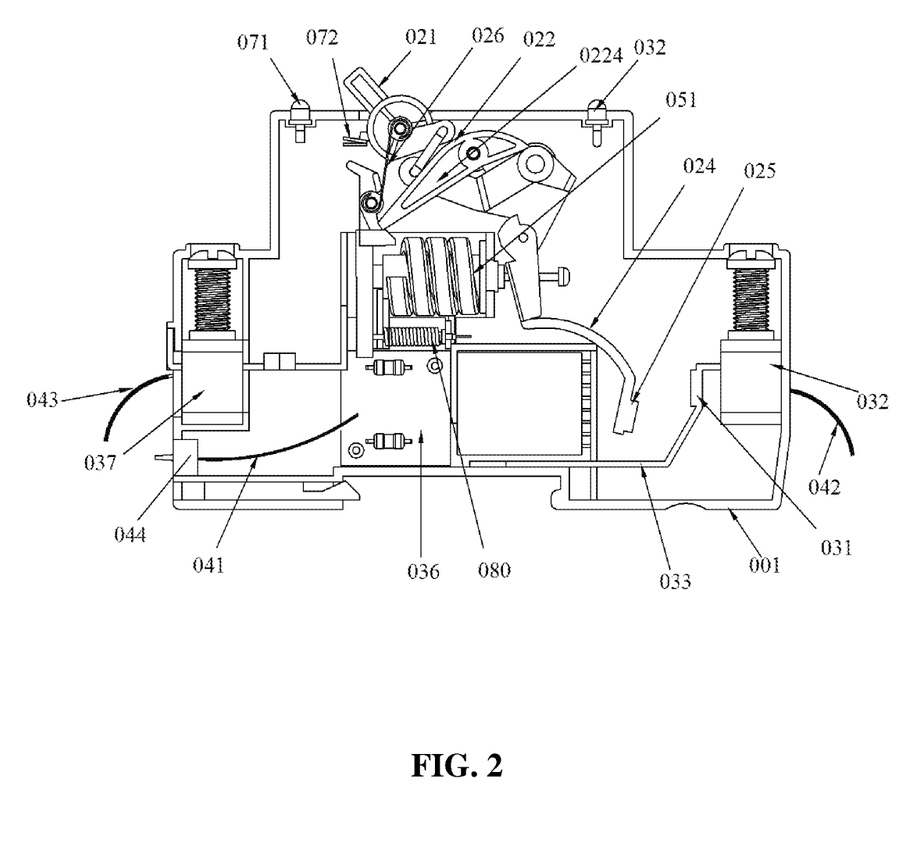
FIG. 2 is a schematic view of a circuit breaker with a time-delay function of an embodiment of the invention.

As shown in FIG. 2, a circuit breaker with a time-delay function of a first embodiment of the invention comprises a first circuit breaking unit, a remote control unit, a housing 001, a feedback circuit, a signal receiving circuit, a decoding circuit, and a parsing circuit.

The first circuit breaking unit and the remote control unit are disposed in the housing 001.

The remote control unit operates to control interruption of the circuit breaker with a time-delay function via a remote control signal.

The housing 001 is made of insulating and flame-retardant materials.

The first circuit breaking unit operates to switch on or off loads and electric lines, and comprises a first operating portion, an arc extinguishing portion, an over-current protecting portion 051, and a first terminal 032.

The first operating portion operates to switch on or off the loads and the electric lines, the arc extinguishing portion operates to prevent arc from corrupting the circuit breaker with a time-delay function, the over-current protecting portion operates to prevent over-current from burning the circuit breaker with a time-delay function, and the first terminal 032 is connected to a phase line 042.

The first operating portion comprises a lever 021, a first movable contact 024, a linkage control block 022 comprising multiple linkage parts, and a static contact point 031.

One end of the lever 021 is disposed outside the housing 001 and operates to switch on or off the electric lines.

A first movable contact point 025 is disposed on one end of the first movable contact 024.

The linkage parts are hinge-connected to each other, one end of an uppermost linkage part is connected to the lever 021, and one end of a downmost linkage part is connected to a front end of the first movable contact 024.

The static contact point 031 is connected to the first terminal 032. As the lever 021 rotates, the linkage control block 022 forces the first movable contact 024 to move, whereby implementing attachment/detachment between the first movable contact point 025 and the static contact point 031, and thus switching on or off the loads and the electric lines.

In order to enable a user to see attachment/detachment off between the first movable contact point 025 and the static contact point 031, a top portion of the housing 001 corresponding to the static contact point 031 is made of transparent insulating and flame-retardant materials, and fluorescent coating is disposed on the static contact point 031 and the first movable contact point 025.

The over-current protecting portion 051 is an electromagnetic release disposed below the first operating portion. One end of the over-current protecting portion 051 is connected to the first movable contact 024, the other end thereof is connected to a support linage part of the linkage control block 052, and the other end of the linkage part 052 is connected to a support linkage part 0224 of the linkage control block 022.

As over current of the electric lines occurs, the over-current protecting portion 051 pulls the first movable contact 024 back and forces the linkage part 052 to rotate, whereby separating the support linkage part 0224 from the linkage part 052, and the first movable contact point 025 from the static contact point 031, and thus disconnecting the loads from the electric lines The arc extinguishing portion operates to prevent arc from corrupting the circuit breaker with a time-delay function, and comprises a metal plate 033 and an arc-extinguishing cover 035. The metal plate 033 is connected to the static contact point 031 and extends to the bottom of the housing 001. The arc-extinguishing cover 035 corresponds to the static contact point 031.

Figure 4:
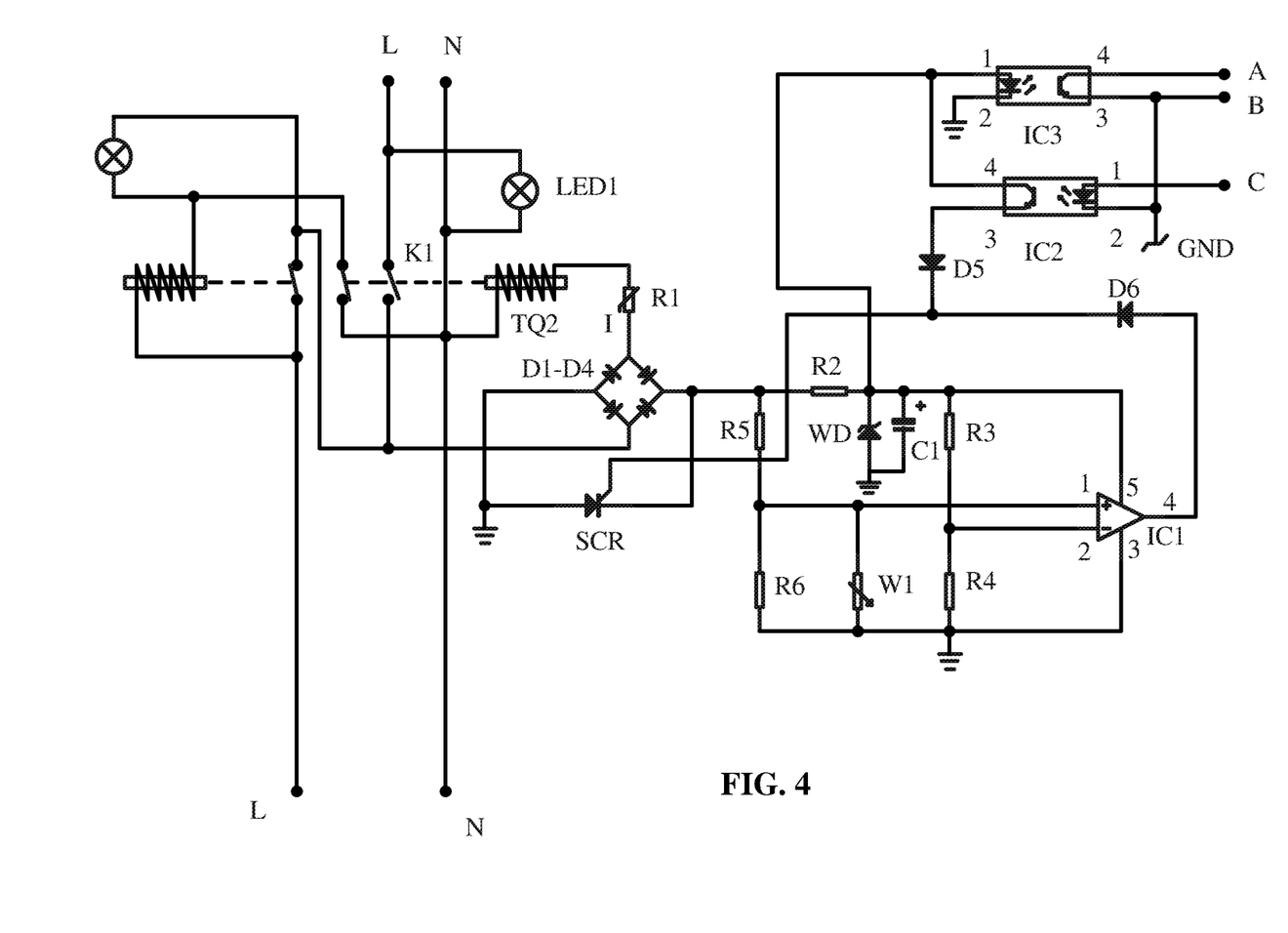
FIG. 4 is a schematic diagram of a circuit breaker with a time-delay function of a further embodiment of the invention.

As shown in FIGS. 2 and 4, the arc extinguishing portion comprises a disconnecting portion and a control circuit.

The disconnecting portion operates to disconnect the loads form the electric lines, and comprises a first electromagnet 080 (TQ2) having a magnet core, and a first armature, the first armature is disposed below the linkage part 052, the first electromagnet 080 (TQ2) is disposed on a support in the housing 001 and below the over-current protecting portion 051. One end of the magnet core abuts against the bottom of the linkage part 052.

The control circuit is connected to the disconnecting portion and operates to control the disconnecting portion, and comprises a power supply circuit, and a power supply control circuit.

The power supply circuit is connected to an electromagnet coil of the disconnecting portion whereby supplying power thereto. The power supply control circuit operates to switch on or off the power supply circuit whereby controlling operation of the disconnecting portion.

The power supply circuit is a rectifying circuit D1-D4, an output end of the power supply circuit is connected to an input end of the electromagnetic coil of the first electromagnet 080 (TQ2), and an input end of the power supply circuit and an output end of the electromagnetic coil of the electromagnet are respectively connected to a phase line terminal and a zero line terminal of an output terminal of the electric line. An input end of the rectifying circuit D1-D4 is connected to the phase line.

The power supply control circuit comprises a first photoelectric coupler IC2, and a thyristor SCR.

One output end of the first photoelectric coupler is connected to a cathode of the rectifying circuit D1-D4, and the first photoelectric coupler operates to transmit a control signal.

The other output end of the first photoelectric coupler IC2 is connected to a control end of the thyristor SCR, and the other two ends of the thyristor SCR are connected to a cathode and an anode of the rectifying circuit D1-D4, whereby switching on or off the control circuit.

Operation of the circuit in FIG. 4 is: As the control signal is applied to the signal input end of the first photoelectric coupler IC2, high potential is generated at the output end of the first photoelectric coupler IC2 and the thyristor SCR is switched on. At this time, current flows through an electromagnet coil of the first electromagnet 080 (TQ2), and the first electromagnet 080 (TQ2) forces the linkage part 052 to rotate, whereby separating the support linkage part 0224 from the linkage part 052, and the first movable contact point 025 from the static contact point 031, and thus disconnecting the loads from the electric lines. As there is no control signal applied to the signal input of the first photoelectric coupler IC2, a reset spring 026 implements connection of the loads with the electric lines.

The feedback circuit operates to transmit switch-on/off information to a remote control center, and comprises a second photoelectric coupler IC3 having an end connected to a cathode of the rectifying circuit D1-D4, and the other end connected to the ground.

As the electric line is not disconnected and there is voltage thereon, an output end of the second photoelectric coupler IC3 outputs a signal to the remote control center via a signal line 041 and a signal socket 044.

The signal receiving circuit operates to receive a wireless control signal from outside.

The decoding circuit is connected to the signal receiving circuit and operates to decode the wireless control signal and to obtain a digital control signal.

The parsing circuit operates to parse the digital control signal, to transform the digital control signal into a voltage signal, and to transmit the voltage signal to the power supply control circuit.

Figure 3:
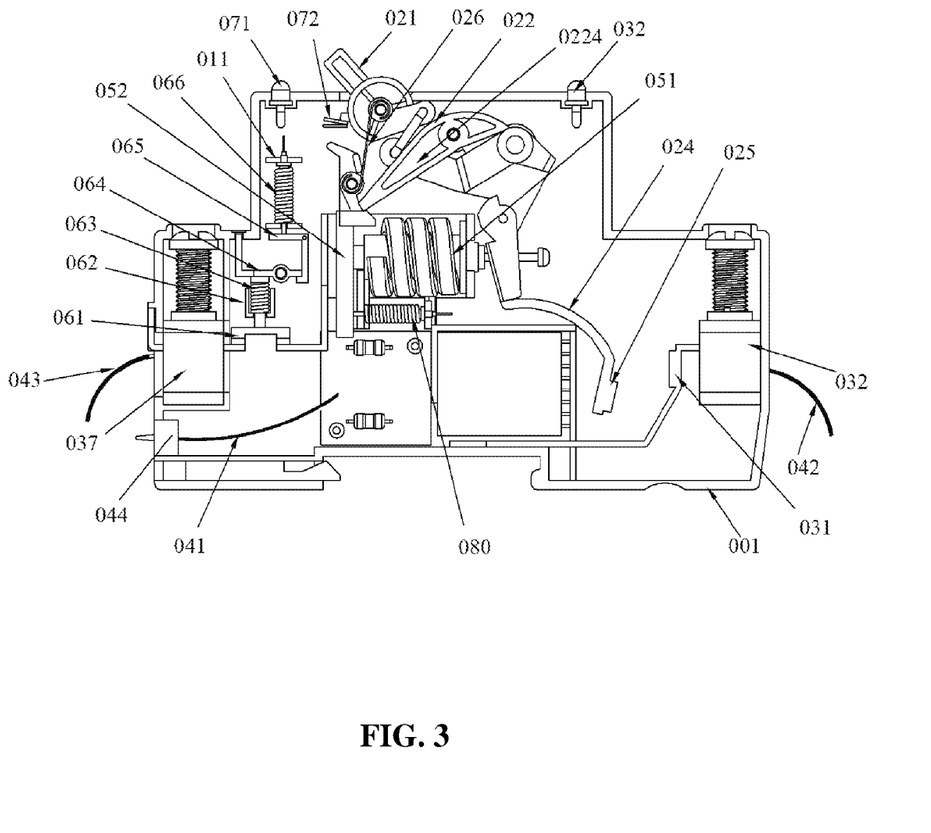
FIG. 3 is a schematic view of a circuit breaker with a time-delay function of another embodiment of the invention.

As shown in FIG. 3, a circuit breaker with a time-delay function of a second embodiment of the invention is almost the same as that of a first embodiment of the invention, except that it further comprises a second circuit breaking unit, a first indicating lamp 071, and a second indicating lamp 032. The second circuit breaking unit comprises a detecting circuit operating to detect whether the first circuit breaking unit fails, and a second operating portion operating to disconnect the loads from the electric lines as the first circuit breaking unit fails. The second circuit breaking unit and the first circuit breaking unit can be disposed on the same side in the housing 001, or on different sides therein.

The detecting circuit comprises a contact switch 072 and a second electromagnet 066. The contact switch 072 is disposed below the lever 021, and one end of the contact switch 072 is connected to the first movable contact 024 via a wire (not shown).

The second electromagnet 066 is disposed on a support 011 in the housing 001, an input end of the second electromagnet 066 is connected to the wire, and an output end of the second electromagnet 066 is connected to a zero line terminal.

As the level 021 is switched to an open circuit position, the contact switch 072 is switched on and the second electromagnet 066 operates since current flows into the coil of the second electromagnet 066 via the first movable contact 024 if a phase line is not disconnected.

The second operating portion comprises a rotatable frame 065, a rotatable plate 064, a first movable contact, and a connecting frame.

The rotatable frame 065 rotates with respect to a hinge shaft and has a lap surface. One end of the magnet core abuts against the rotatable frame 065.

The rotatable plate 064 rotates with respect to the hinge shaft, and one end of the rotatable plate 064 abuts against the lap surface of the rotatable frame 065.

The second movable contact is disposed in a support 062 in the housing 001, and comprises a T-shaped holder 061 and a spring 063. The spring 063 is fit on the T-shaped holder 061. A conductive contact point is disposed on one end of the T-shaped holder 061, the other end of the T-shaped holder 061 abuts against the other end of the rotatable plate 064, and the spring 063 is in a compressed state under a normal condition.

A second terminal 037 is disposed in the connecting frame and connected to a phase line 043 extended from the first circuit breaking unit via a pair of stationary contact points.

Under a normal condition, the conductive contact point and the static contact points are on. As the detecting circuits detects the first circuit breaking unit fails (namely the first removable contact point 025) is not detached from the static contact point 031), current flows through the coil of the second electromagnet 066 and the magnet core pushes the rotatable frame 065 to rotate with respect to the hinge shaft. At this time an end of the rotatable plate 064 is detached from the lap surface of the rotatable frame 065 and the T-shaped holder 061 moves upwardly under the action of the spring 063, and thus the conductive contact point is detached from the static contact points whereby disconnecting the phase line 042 from the phase line 043. This disconnecting process is mandatory and non-recoverable.

The first indicating lamp 071 (shown as LED2 in FIGS. 4 and 5) operates to indicate whether a switch-off function of the first circuit breaking unit fails.

The second indicating lamp 032 (shown as LED1 in FIGS. 4 and 5) is connected to the zero line and the first terminal 042, and operates to indicate whether there is voltage on the electric lines.

In this embodiment, the first indicating lamp 071 and the second indicating lamp 032 are neon lamps. In another embodiment, if other kinds of lamps that can only work within a voltage range, a power conversion circuit operating to converting voltage of the electric lines whereby supplying power to the first indicating lamp 071 and the second indicating lamp 032 is needed. The power conversion circuit is well-known to those skilled in the art, and will not be described hereinafter.

As shown in FIG. 4, a circuit breaker with a time-delay function of a third embodiment of the invention is almost the same as that of a second embodiment of the invention, except that it further comprises an over-voltage protecting portion and a slide rheostat W1. The over-voltage protecting portion operates to output a control signal whereby disconnecting the loads from the electric lines as over-voltage occurs on the electric lines.

The over-voltage protecting portion comprises a voltage signal sampling circuit, and an over-voltage determining circuit comprising a comparator IC1.

The voltage signal sampling circuit is connected to a cathode of the rectifying circuit D1-D4, whereby obtaining a voltage of the electric lines. The voltage signal sampling circuit comprises a pair of resistors R5 and R6 serially connected to each other. A voltage sampling point is disposed between the resistors R5 and R6.

An output end of the voltage signal sampling circuit is connected to an in-phase input end of the comparator IC1, and a reference voltage is set on an anti-phase input end thereof. A voltage stabilizing circuit obtains the reference voltage from a cathode of the rectifying circuit D1-D4, comprises a zener diode WD and a capacitor C1 parallel connected to each other, and operates to provide stable voltage to the comparator IC1.

An output end of the comparator IC1 is connected to a control end of the thyristor SCR.

A diode D6 is disposed between the comparator IC1 and the thyristor SCR whereby preventing current from flowing reversely and damaging the comparator IC1.

As a voltage on the in-phase input end of the comparator IC1 is too high, the comparator IC1 outputs a high potential signal whereby switching on the thyristor SCR, and current flows through the coil of the first electromagnet 080 (TQ2) and the first electromagnet 080 (TQ2) pushes the linkage part 052 to rotate with respect to the hinge shaft. At this time the support linage part 0224 is detached from the linkage part 052, and thus the first removable contact point 025 is detached from the static contact point 031 whereby disconnecting the loads from the electric lines. If no over voltage occurs, this disconnecting process is recoverable as the reset spring 026 exists.

The slide rheostat W1 is disposed between the in-phase input end of the comparator IC1 and the ground, or between the anti-phase input end of the comparator IC1 and the ground (not shown), and operates to adjust a maximum permit voltage. By changing a resistance value of the slide rheostat W1, a voltage on the in-phase input end or the anti-phase input end of the comparator IC1 and thus an over-voltage value are adjusted.

In another embodiment, the over-voltage determining circuit comprises an analog-to-digital converter, and a processor. A cathode of the rectifying circuit D1-D4 is connected to an input end of the analog-to-digital converter, and an output end of the analog-to-digital converter is connected to an input end of the processor.

As over voltage occurs in the electric lines, the processor switches on the thyristor whereby switching off the electric lines. A threshold voltage of the processor can be adjusted without the slide rheostat W1.

Figure 5:
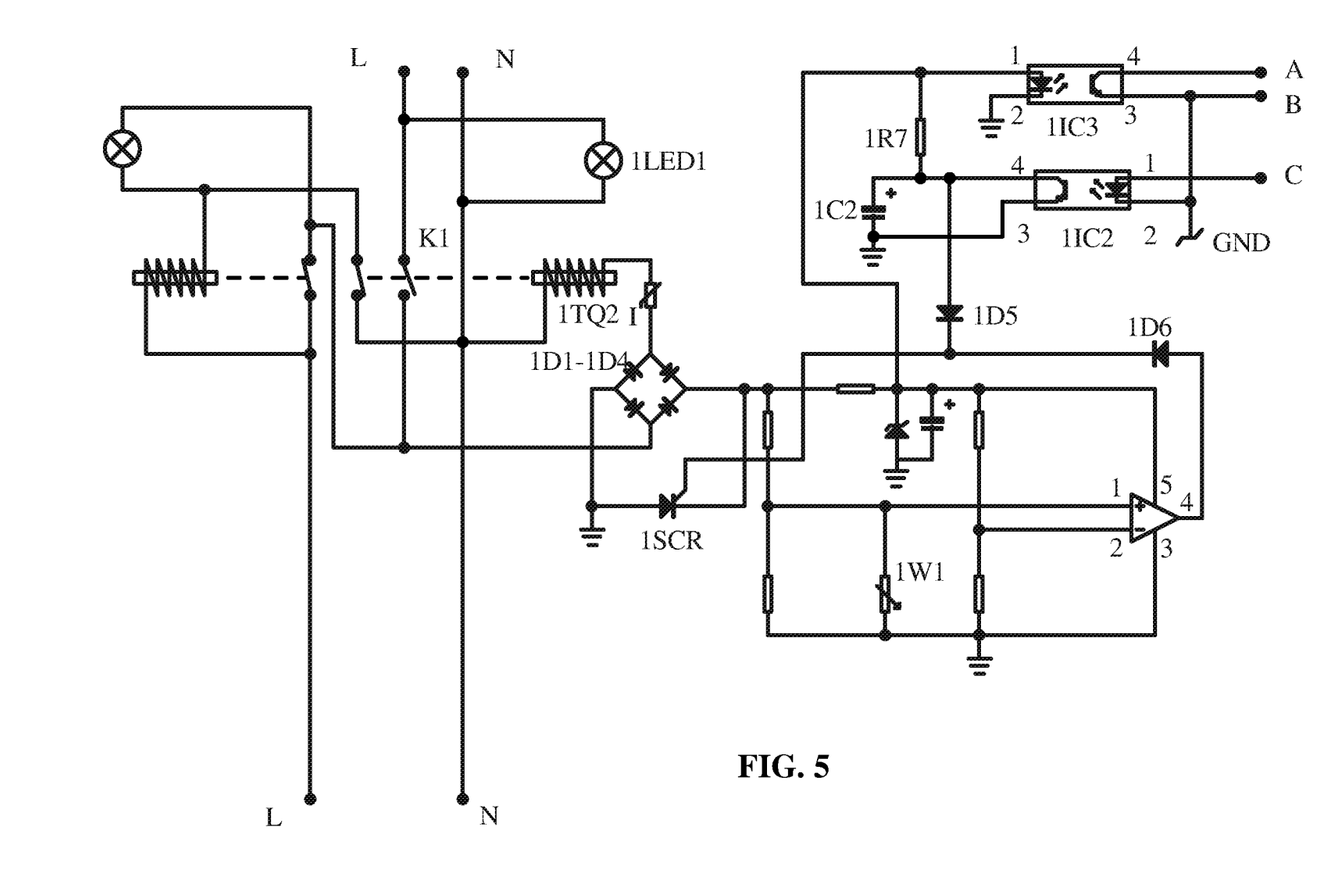
FIG. 5 is another schematic diagram of a circuit breaker with a time-delay function of a further embodiment of the invention.

As shown in FIG. 5, a circuit breaker with a time-delay function of a fourth embodiment of the invention is almost the same as that of a third embodiment of the invention, except that the power supply control circuit and the feedback circuit are different, and a time-delay control circuit is added.

The power supply control circuit comprises a first photoelectric coupler 1IC2 and a thyristor 1SCR. One output end of the first photoelectric coupler 1IC2 is connected to a capacitor 1C2, and the first photoelectric coupler 1IC2 operates to transmit a control signal, A control end of the thyristor 1SCR is connected to the other output end of the first photoelectric coupler 1IC2, and the other two ends of the thyristor 1SCR are connected to the anode and the cathode of the rectifying circuit 1D1-1D4 whereby switching on or off the control circuit. A diode 1D5 operates to prevent current from flowing reversely and damaging the first photoelectric coupler 1IC2.

As the control signal is applied to the signal input end of the first photoelectric coupler 1IC2, low potential is generated on an output end 4 of the first photoelectric coupler 1IC2, and remote switch-off control is not started. As there is no signal input on an control end C of the first photoelectric coupler, the thyristor 1SCR is switched on, current flows through the coil of the first electromagnet 080 (TQ2), and the magnet core of the first electromagnet 080 (TQ2) pushes the linkage part 052 to rotate with respect to the hinge shaft. At this time the support linage part 0224 is detached from the linkage part 052, and thus the first removable contact point 025 is detached from the static contact point 031 whereby disconnecting the loads from the electric lines. If the control signal is applied to the signal input end of the first photoelectric coupler 1IC2, this disconnecting process is recoverable as the reset spring 026 exists. If someone damages a remote input end, there is no voltage input on the signal input end of the first photoelectric coupler 1IC2, and the circuit breaker with a time-delay function switches off the circuit.

The time-delay control circuit comprises a resistor 1R7 and a second photoelectric coupler 1IC3. One end of the resistor 1R7 is connected to a pin 1 of the second photoelectric coupler 1IC3, and the other end thereof is connected to a pin 4 of the first photoelectric coupler 1IC2. The time-delay control circuit is serially connected to the capacitor 1C2, whereby generating a time delay effect and preventing erroneous operation before a remote control signal arrives.

Figure 6:
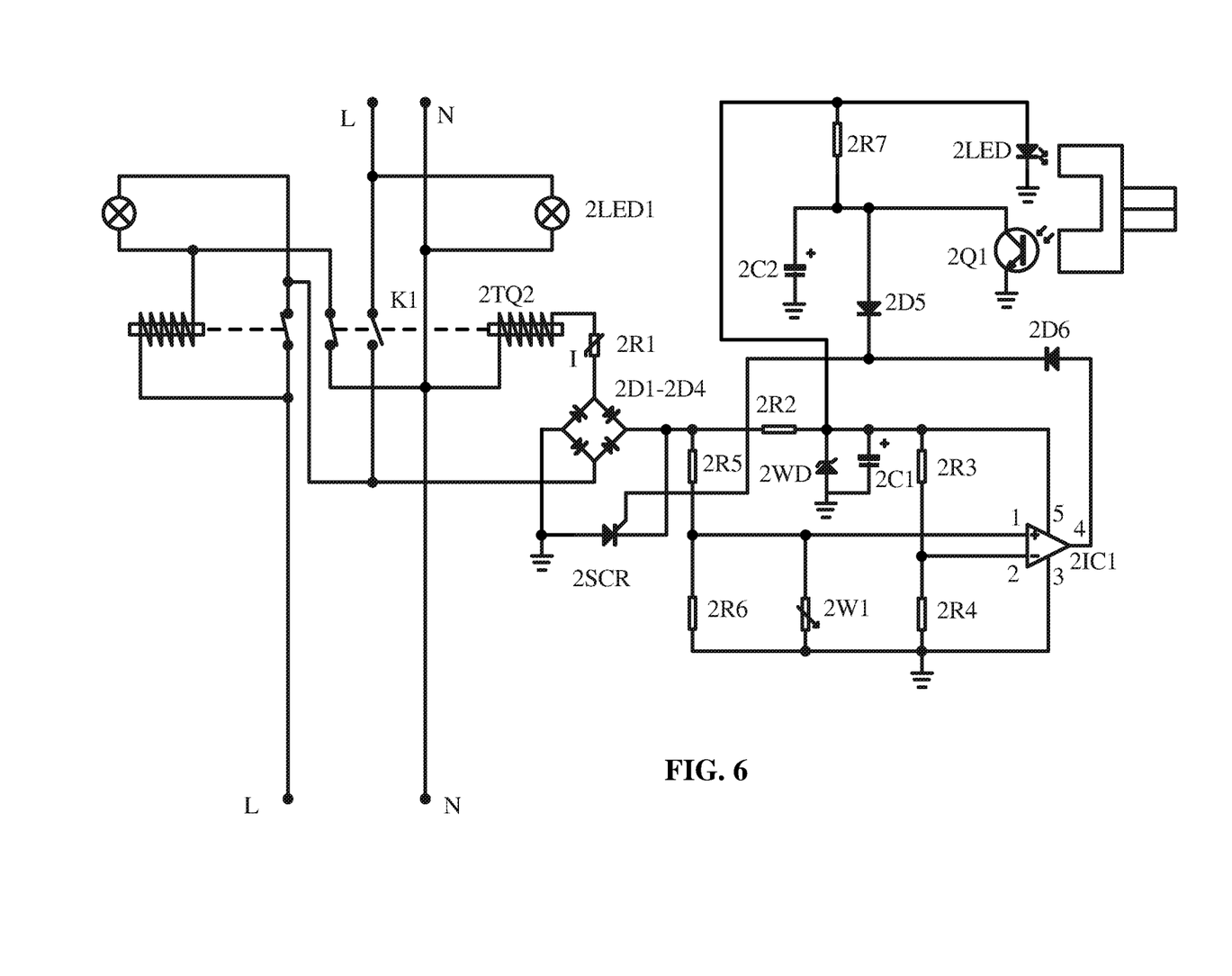
FIG. 6 is a further schematic diagram of a circuit breaker with a time-delay function of a further embodiment of the invention.

As shown in FIG. 6, a circuit breaker with a time-delay function of a fifth embodiment of the invention is almost the same as that of a fourth embodiment of the invention, except that the power supply control circuit and the feedback circuit are different, and a time-delay control circuit is added.

The power supply control circuit comprises a photoelectric receiving tube 2Q1, and a thyristor 2SCR.

The photoelectric receiving tube 2Q1 receives an optical signal from a remote control center via optical fiber and a plug, and an output end of the photoelectric receiving tube 2Q1 is connected to the ground.

A control end of the thyristor 2SCR is connected to the other end of the photoelectric receiving tube 2Q1, and the other two ends of the thyristor 2SCR are connected to a cathode and an anode of the rectifying circuit 2D1-2D4, whereby switching on or off the control circuit.

The feedback circuit comprises a light emitting diode (LED) having an end connected to a cathode of the rectifying circuit 2D1-2D4, and the other end connected to the ground.

As the electric line is connected, an output end of the LED 2LED outputs an optical signal, and transmits the optical signal to a remote control device via the optical fiber and the plug.

The time-delay control circuit comprises a resistor 2R7. One end of the resistor 2R7 is connected to an end of the LED 2LED, and the other end thereof is connected to the other end of the photoelectric receiving tube 2Q1. The time-delay control circuit is serially connected to a capacitor 2C2, whereby generating a time delay effect and preventing erroneous operation before a remote control signal arrives.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A circuit breaker with a time-delay function, comprising
a first circuit breaking unit;
a remote control unit comprising a time-delay control circuit; and
a housing;
wherein
said first circuit breaking unit and said remote control unit are disposed in said housing;
said first circuit breaking unit operates to switch on or off loads and electric lines;
said remote control unit operates to control interruption of the circuit breaker with a time-delay function via a remote control signal;
said time-delay control circuit operates to implement time delay after said remote control unit receives said remote control signal and before said first circuit breaking unit switches on or off said loads and said electric lines; and
said housing is made of insulating and flame-retardant materials.

2. The circuit breaker of claim 1, wherein
said first circuit breaking unit comprises a first operating portion, an arc extinguishing portion, an over-current protecting portion, and a first terminal.
said first operating portion operates to switch on or off said loads and said electric lines;
said arc extinguishing portion operates to prevent arc from corrupting the circuit breaker;
said over-current protecting portion operates to prevent over-current from burning the circuit breaker; and
said first terminal is connected to a phase line.

3. The circuit breaker of claim 2, wherein
said first operating portion comprises a lever, a first movable contact, a linkage control block comprising multiple linkage parts, and a static contact point;
one end of said lever is disposed outside said housing and operates to switch on or off said electric lines;
a first movable contact point is disposed on one end of said first movable contact;
said linkage parts are hinge-connected to each other;
one end of an uppermost linkage part is connected to said lever;
one end of a downmost linkage part is connected to a front end of said first movable contact;
said static contact point is connected to said first terminal; and
fluorescent coating is disposed on said static contact point and said first movable contact point.

4. The circuit breaker of claim 2, wherein
said over-current protecting portion is disposed below said first operating portion;
one end of said over-current protecting portion is connected to said first movable contact;
the other end thereof is connected to a support linage part of the linkage control block;
said over-current protecting portion is an electromagnetic release; and
said over-current protecting portion separates said first movable contact point from said static contact point whereby disconnecting said loads from said electric lines as over current of said electric lines occurs.

5. The circuit breaker of claim 1, wherein
said remote control unit comprises a disconnecting portion and a control circuit;
said disconnecting portion operates to disconnect said loads form said electric lines; and
said control circuit is connected to said disconnecting portion and operates to control said disconnecting portion.

6. The circuit breaker of claim 5, wherein
said disconnecting portion comprises a first electromagnet having a magnet core, and a first armature;
said first armature is disposed below said linkage part; and
one end of said first electromagnet corresponds to said first armature, said disconnecting portion comprises a first electromagnet having a magnet core, and a first armature;
said first armature is disposed below said linkage part; and
one end of said first electromagnet corresponds to said first armature.

7. The circuit breaker of claim 5, wherein
said control portion comprises a power supply circuit, and a power supply control circuit;
said power supply circuit is connected to said electromagnet coil of said disconnecting portion whereby supplying power thereto; and
said power supply control circuit operates to switch on or off said power supply circuit whereby controlling operation of said disconnecting portion.

8. The circuit breaker of claim 7, wherein
said power supply circuit is a rectifying circuit;
an output end of said power supply circuit is connected to an input end of an electromagnetic coil of said first electromagnet; and
an input end of said power supply circuit and an output end of said electromagnetic coil of said electromagnet are respectively connected to a phase line terminal and a zero line terminal of an output terminal of said electric line.

9. The circuit breaker of claim 7, wherein
said power supply control circuit comprises a first photoelectric coupler, and a thyristor;
one output end of said first photoelectric coupler is connected to a cathode of said power supply circuit;
said first photoelectric coupler operates to transmit a control signal;
the other output end of said first photoelectric coupler is connected to a control end of said thyristor; and
the other two ends of said thyristor are connected to a cathode and an anode of said power supply circuit, whereby switching on or off said control circuit.

10. The circuit breaker of claim 7, wherein
said power supply control circuit comprises a photoelectric receiving tube, and a thyristor;
said photoelectric receiving tube receives an optical signal from a remote control center via optical fiber and a plug;
an output end of said photoelectric receiving tube is connected to the ground;
a control end of said thyristor is connected to the other end of said photoelectric receiving tube;
the other two ends of said thyristor are connected to a cathode and an anode of said power supply circuit, whereby switching on or off said control circuit.

11. The circuit breaker of claim 7, wherein
said time-delay control circuit comprises a capacitor and a resistor;
one end of said capacitor is connected to the other output end of said first photoelectric coupler, and the other end thereof is connected to the ground; and
one end of said resistor is connected to the end of said capacitor, and the other end thereof is connected to said power supply circuit.

12. The circuit breaker of claim 5, further comprising a feedback circuit, comprising a second photoelectric coupler having an end connected to a cathode of said power supply circuit, and the other end connected to the ground.

13. The circuit breaker of claim 12, wherein an output end of said second photoelectric coupler outputs a switching signal to a remote control device as said electric line is connected.

14. The circuit breaker of claim 5, further comprising a feedback circuit, comprising a light emitting diode (LED) having an end connected to a cathode of said power supply circuit, and the other end connected to the ground.

15. The circuit breaker of claim 14, wherein an output end of said LED outputs an optical signal, and transmits said optical signal to a remote control device via said optical fiber and said plug as said electric line is connected.

16. The circuit breaker of claim 5, further comprising
a signal receiving circuit operating to receive a wireless control signal from outside;
a decoding circuit connected to said signal receiving circuit and operating to decode said wireless control signal and to obtain a digital control signal; and
a parsing circuit operating to parse said digital control signal, to transform said digital control signal into a voltage signal, and to transmit said voltage signal to said power supply control circuit.

17. The circuit breaker of claim 1, further comprising a second circuit breaking unit operating to disconnect said loads from said electric lines as said first circuit breaking unit fails.

18. The circuit breaker of claim 17, wherein said second circuit breaking unit comprises
a detecting circuit operating to detect whether said first circuit breaking unit fails; and
a second operating portion operating to disconnect said loads from said electric lines as said first circuit breaking unit fails.

19. The circuit breaker of claim 18, wherein
said detecting circuit comprises a contact switch and a second electromagnet;
said contact switch is disposed below said lever;
one end of said contact switch is connected to an end of said first movable contact via a wire;
said second electromagnet is disposed on a support in said housing;
an input end of said second electromagnet is connected to said wire;
an output end of said second electromagnet is connected to a zero line terminal;
said contact switch is switched on as said level is switched to an open circuit position; and said second electromagnet operates as no phase line is disconnected.

20. The circuit breaker of claim 18, wherein
said second operating portion comprises a rotatable frame, a rotatable plate, a second movable contact, and a connecting frame;
said rotatable frame rotates with respect to a hinge shaft and has a lap surface;
one end of said magnet core abuts against said rotatable frame;
said rotatable plate rotates with respect to said hinge shaft;
one end of said rotatable plate abuts against said lap surface of said rotatable frame;
said second movable contact is disposed in said support, and comprises a T-shaped holder and a spring;
said spring is fit on said T-shaped holder;
a conductive contact point is disposed on one end of said T-shaped holder;
the other end of said T-shaped holder abuts against the other end of said rotatable plate; and
a second terminal is disposed in said connecting frame and connected to said phase line via a pair of stationary contact points.

\* \* \* \* \*